O. HOFSTRAND.
CLOTHES LINE ADJUSTER AND WINDER.
APPLICATION FILED JUNE 28, 1915.
1,191,598. Patented July 18, 1916.
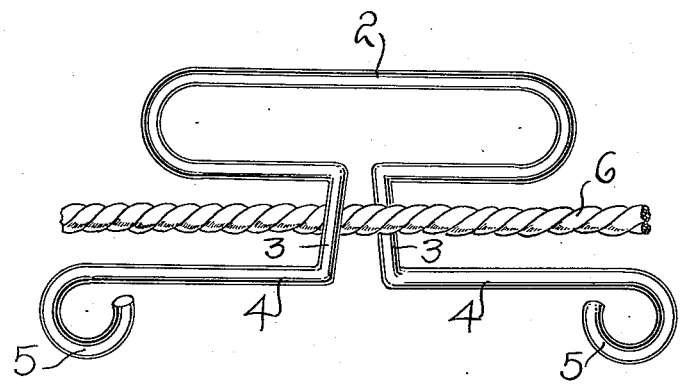
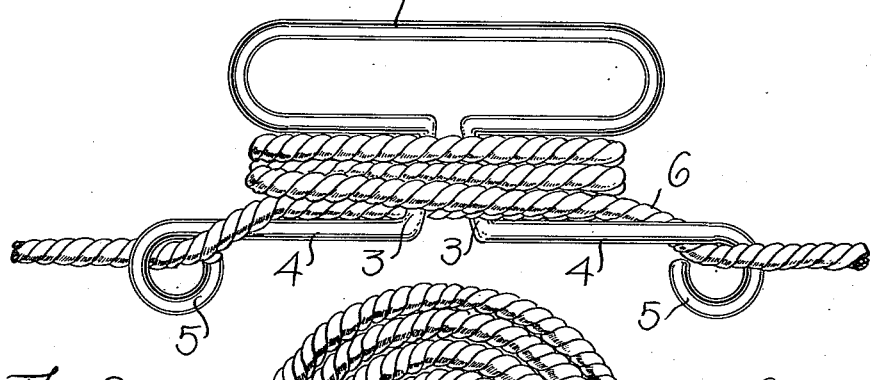
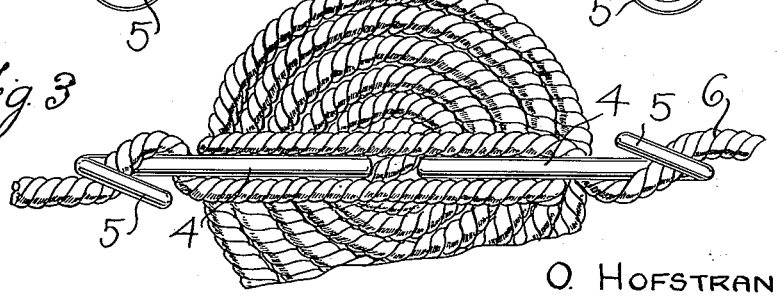
Inventor
O. HOFSTRAND
By Watson E. Coleman
Attorney

UNITED STATES PATENT OFFICE.

OSKAR HOFSTRAND, OF BROOKLYN, NEW YORK.

CLOTHES-LINE ADJUSTER AND WINDER.

1,191,598.　　　Specification of Letters Patent.　　Patented July 18, 1916.

Application filed June 28, 1915. Serial No. 36,831.

*To all whom it may concern:*

Be it known that I, OSKAR HOFSTRAND, a citizen of the United States, residing at Brooklyn, in the county of Kings and State of New York, have invented certain new and useful Improvements in Clothes-Line Adjusters and Winders, of which the following is a specification, reference being had to the accompanying drawings.

My invention relates to clothes line attachments, though it may be used for other purposes, and particularly to a device for tightening up and reeling up lines such as clothes lines, electric light cords, and like flexible connections.

The primary object of my invention is the provision of a very simple device of this character which may be readily disposed upon a line to be tightened or adjusted at any suitable point, and may then be rotated so as to reel or wind up the line upon the device, means being provided whereby after the line has been reeled up the adjusting device may be engaged with the cord or line to prevent a reverse rotation of the device.

My invention is illustrated in the accompanying drawings, wherein:

Figure 1 is an elevation of the device applied to a cord or line, but before the reeling operation has been accomplished; Fig. 2 is a like view to Fig. 1, but showing the manner in which the cord or line is reeled around the tightening device; and Fig. 3 is a plan view of the construction shown in Fig. 2.

My improved line tightener or adjuster is formed by a length of heavy wire which may be slightly resilient, the length of wire being first bent to form the elliptical handle loop 2. The ends of the wire then extend outward from the loop in approximately parallel spaced relation, as at 3, and at right angles to the handle loop but in practically the same plane thereas so as to form a loop winding or reeling member. The wire is then bent in opposite directions, in the plane of the loop 2, to form the arms 4. The extremities of these arms are formed with the open loops or hooks 5, one of which is deflected laterally in one direction relative to the plane of the loop 2 and the other deflected laterally in the other direction, as shown most clearly in Fig. 3.

It is to be noted that the portions 3—3 converge toward the handle loop so that the larger end of the space between these portions 3—3 is slightly greater in diameter than the line 6, while the small end of the space is less than the diameter of the rope or line so that while the line may be inserted between the portions 3—3 at the large end of the space it cannot pass into the loop 2. Furthermore, the line as it is forced between the portions 3—3 is resiliently engaged by these portions or wedged into position so that the tightening device becomes firmly attached to the line or rope. If it is now desired to tighten up upon the rope the device is rotated by means of the handle 2 a greater or less number of times as may be desired so that the rope or line is wound or reeled upon the portions 3—3 which thus form a rope reeling or winding member The coils of rope or line are thus supported as shown in Fig. 2 between the handle loop and the arms 4. After a sufficient number of turns have been made of the tightening device, the hook ends 5 of the arms 4 are engaged with the rope or line as illustrated in Figs. 2 and 3. It will be seen that by deflecting these hooks 5 the rope may be passed into the hooks or open loops but cannot readily become detached therefrom as a direct pull upon the rope will cause the rope to bind between the bill of the hook and the shanks thereof.

It will be seen now that the tension of the rope will hold the device in its adjusted position, and if it is desired to loosen up upon the rope the rope is disengaged from the hooks 5 and the device reversely rotated until a proper adjustment of the rope has been secured. This device may be used, it will be obvious, as a reel for the rope and the rope permanently kept upon the device, and after the ends of the rope have been connected to the usual supporting hooks the rope may be tightened up as before described or otherwise adjusted.

It will be seen that my invention is very simple, may be cheaply made, and is thoroughly effective in practice. It may be readily applied or readily detached from any rope and its usefulness is not limited to clothes lines or like lines but the device may also be used for adjusting any flexible connections capable of being wound upon the members 3.

Having thus described my invention, what I claim is:

1. A line tightener and adjuster comprising a handle formed by an open loop, said handle having outwardly projecting approximately parallel spaced members extending from the opening of the loop forming a line engaging and winding portion, said members each having a radially projecting arm, the arms projecting in opposite directions and the extremities of the arms being formed with bends for engagement with the line as it is wound upon the tightener to prevent a reverse unwinding movement of the tightener.

2. A line tightener and adjuster comprising a handle having outwardly projecting approximately parallel spaced members forming a line engaging and winding portion, said members being spaced from each other along their entire extent to provide for the reception of the line between the members and the insertion of the line into the space between said members from the end opposite the handle, said members each having a radially projecting arm, the arms projecting in opposite directions and the extremities of the arms being formed with bends for engagement with the line after it is wound upon the tightener to prevent a reverse unwinding of the tightener.

3. A line tightener comprising a handle formed by an open loop and having outwardly projecting members extending from the handle at the opening of the loop and disposed in convergent relation toward the handle member, the ends of said spaced members having oppositely projecting radially extending arms disposed in the plane of the loop and formed on their ends with open hooks, the hooks being laterally deflected in opposite directions.

4. A line tightener and adjuster formed of a single piece of wire bent to provide an open loop forming an elliptical handle, the ends of the wire at the opening of the loop being bent outward in spaced divergent relation to form a rope engaging and winding member, the space between the inner ends of said outwardly bent portion being less than the diameter of the rope to be engaged, and the wire at the extremity of the outwardly bent portions being again bent to provide arms extending laterally outward and away from each other in the plane of the looped portion, said arms being formed at their extremities with open hooks, the hooks being laterally deflected in opposite directions.

In testimony whereof I hereunto affix my signature in the presence of two witnesses.

OSKAR HOFSTRAND.

Witnesses:
  J. BJORLING,
  G. BJORLING.